United States Patent [19]
Peterson

[11] Patent Number: 5,098,151
[45] Date of Patent: Mar. 24, 1992

[54] AUTOMOTIVE SUNSHADE MOUNTING BRACKET

[75] Inventor: Don M. Peterson, Quincy, Mich.

[73] Assignee: Crotty Corporation, Quincy, Mich.

[21] Appl. No.: 681,696

[22] Filed: Apr. 5, 1991

[51] Int. Cl.⁵ .................................................. B60J 3/00
[52] U.S. Cl. ................................. 296/97.9; 248/289.1
[58] Field of Search .............. 296/97.9, 97.11, 97.12, 296/97.13; 248/289.1

[56] References Cited

U.S. PATENT DOCUMENTS

| | | | |
|---|---|---|---|
| 4,521,046 | 6/1985 | Foggini | 296/97 |
| 4,756,570 | 7/1988 | Cooper | 296/97 |
| 4,893,866 | 1/1990 | Dowd et al. | 296/314 |
| 4,913,484 | 4/1990 | Dowd et al. | 296/97.12 |
| 5,031,954 | 7/1991 | Peterson et al. | 296/97.9 |

FOREIGN PATENT DOCUMENTS 3413636 10/1985 Fed. Rep. of Germany .

Primary Examiner—Robert R. Song
Attorney, Agent, or Firm—Baker & Daniels

[57] ABSTRACT

A mounting bracket assembly for a vehicle sunshade includes a hook end and an axially opposite fastener end, wherein the hook end is insertable into a first aperture in the vehicle roof, after which the assembly is rotated so that the fastener end is received within a second aperture in the roof and is attached thereto by a single fastener.

14 Claims, 4 Drawing Sheets

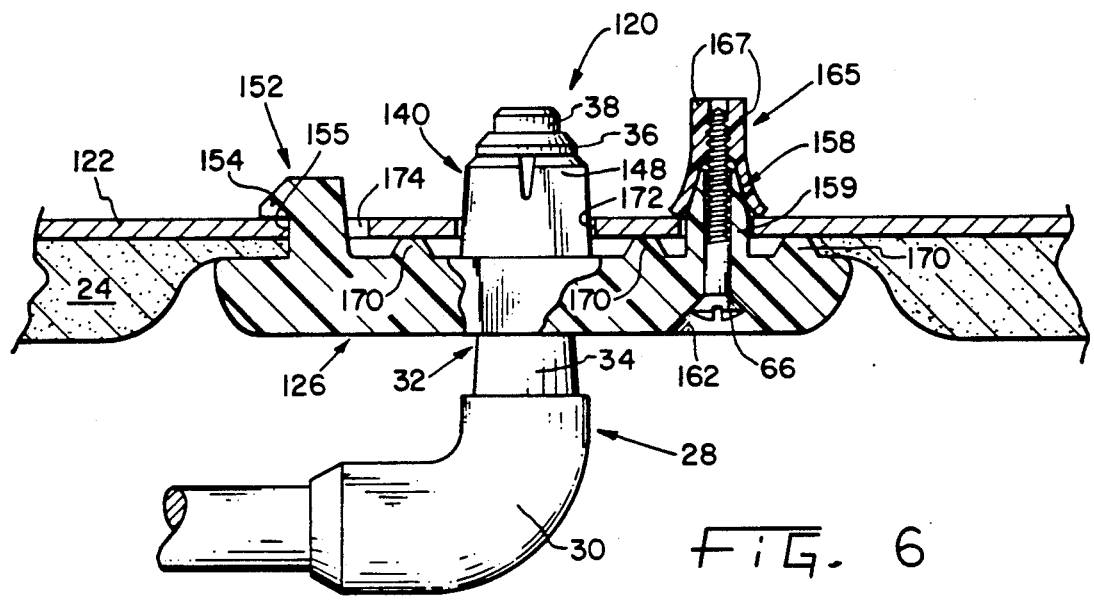
FIG. 6
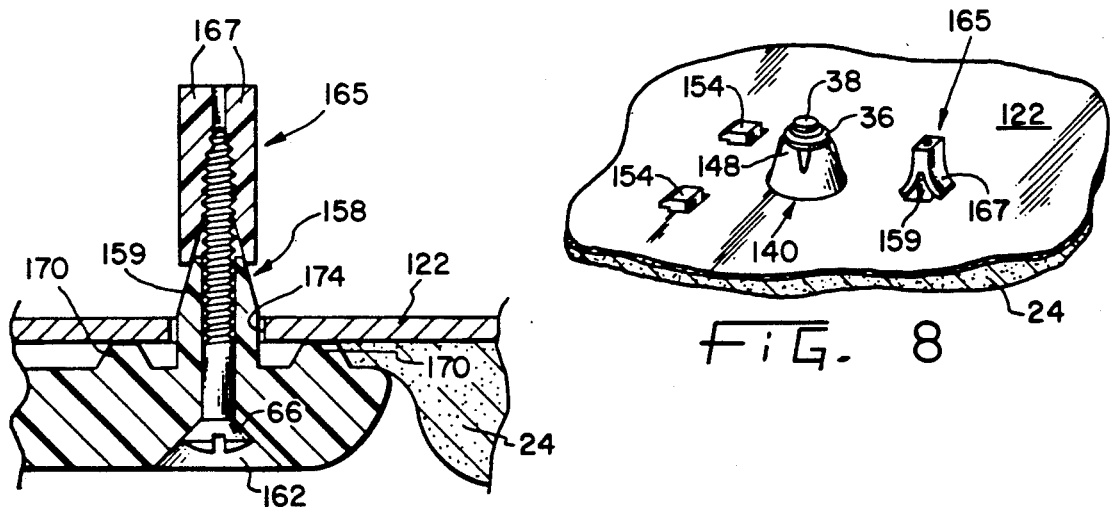
FIG. 7
FIG. 8

2

AUTOMOTIVE SUNSHADE MOUNTING BRACKET

BACKGROUND OF THE INVENTION

The present invention relates generally to sunshades for vehicles and, more particularly, to a mounting bracket that allows the sunshade to be operably attached to a vehicle roof.

Sunshades for vehicles are typically mounted on the vehicle body roof by an elbow bracket that provides both a horizontal axis about which a visor blade pivots between a storage position adjacent the vehicle headliner and a use position adjacent the windshield, and a vertical axis about which the visor pivots approximately 90° between a forward windshield position and a side window position. One method of mounting the elbow bracket in the headliner of the vehicle to the underlying sheet metal roof is by a plurality of screws.

Several problems are associated with the use of screws to attach a sunshade mounting bracket to a vehicle roof, including the amount of labor required for assembly, the unsightliness of the screws, the variations in the sunshade mounting angle caused by improperly torqued screws, and the possibility of producing scrap components due to improper assembly techniques. In general, prior art snap-in mount designs have addressed these problems; however, such mounts do not appear to provide as secure an attachment and may be more difficult to attach and/or detach from the vehicle roof.

In an effort to reduce the number of screws utilized in mounting the sunshade to the vehicle while providing a secure attachment, it is desired to provide an improved mounting bracket.

SUMMARY OF THE INVENTION

The present invention overcomes the problems and disadvantages of the above-described prior art sunshades by providing a mounting bracket having a hook end and a fastener end, wherein the hook end first engages the vehicle roof and, thereafter, the bracket is rotated until the fastener end engages the roof and is attached thereto by a single fastener.

More particularly, the invention provides a sunshade mounting bracket including a boss incorporating a hook configuration and an opposite fastener configuration, such that the sunshade is installed by inserting the boss through an opening in the roof sheet metal. The hook portion comprises a recess having a transversely extending support surface that is received through the opening in the roof and engages a back surface thereof. The fastener portion is received through an opening in the roof and is retained therein by manual actuation of a fastener member, whereby the mounting bracket is installed with a single fastener member.

An advantage of the sunshade mounting bracket of the present invention is that only one fastener is required, thereby decreasing the cost and labor required for assembly of the mounting bracket to the vehicle roof.

Another advantage of the sunshade mounting bracket of the present invention, in one form thereof, is that the bracket may be utilized on existing vehicle roofs that are designed to receive conventional screw mounts.

A further advantage of the sunshade mounting bracket of the present invention is that the bracket may be easily removed once installed.

Yet another advantage of the sunshade mounting bracket of the present invention is that, upon installation, the bracket provides stability against movement relative the vehicle roof.

The invention, in one form thereof, provides a mounting apparatus for attaching a sunshade to a vehicle roof having an opening therein. The apparatus includes a bracket assembly having a hook portion for retaining one end of the bracket assembly in the opening and a fastener end at the axially opposite end of the bracket assembly for retaining the second end in the opening subsequent to retention of the first end.

The invention further provides, in one form thereof, a bracket for mounting a vehicle sunshade against a vehicle roof. The bracket includes two spaced ends which are each in contact with a back surface of the roof through a mounted opening provided therein. The bracket further includes a support surface for supporting one end of the bracket against the back surface of the roof and a manually actuable fastener portion for supporting the other end of the bracket against the back surface of the roof.

The invention further provides, in one form thereof, a method of attaching a sunshade to a vehicle roof having an opening therein. A sunshade mount is provided having a bracket assembly including a hook portion and an axially opposed manually actuable fastener portion. The sunshade mount is placed adjacent the vehicle roof such that the hook portion is inserted into a first end of the opening. The bracket arm is then rotated until the fastener portion is inserted into the second end of the opening. The fastener portion is then actuated until it is retained within the opening.

BRIEF DESCRIPTION OF THE DRAWINGS

FIG. 6 is a sectional view of an alternative mounting bracket in accordance with an alternative embodiment of the present invention, wherein the mounting bracket includes two fastening hooks and a separate mounting boss for the bracket arm;

FIG. 7 is an enlarged fragmentary view of the fastening portion of the mounting bracket of FIG. 6; and FIG. 8 is a perspective view of the mounting bracket and arm assembly of FIG. 6 as seen from behind the vehicle roof.

DESCRIPTION OF THE PREFERRED EMBODIMENT

Figure 1:
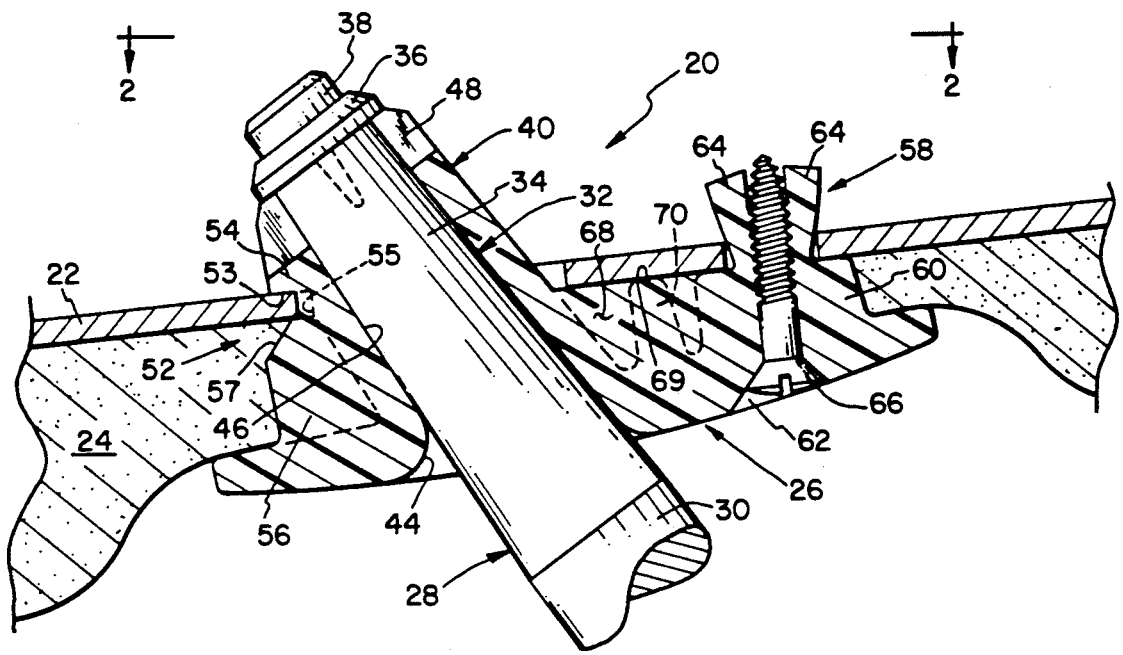
FIG. 1 is a fragmentary partial sectional view of the mounting bracket and arm assembly of the present invention shown installed in a vehicle roof.

Referring now to the drawings, and in particular to FIG. 1, a mounting bracket and arm assembly 20 for an automotive sunshade is shown operably attached to a vehicle roof having a sheet metal layer 22 and a covering 24 of foam-backed cloth or some other suitable headliner material. Assembly 20 generally includes a mounting bracket 26 and a bracket arm 28 rotatably connected to bracket 26. Bracket 26 serves as a horizontal axis for rotation of the sunshade between a storage position and a first use position adjacent the front windshield. Bracket 26 also serves as a vertical axis for movement of the sunshade body to a second use position adjacent the side window.

Bracket arm 28 is generally L-shaped (FIG. 6), and includes an elbow portion 30 and a leg portion 32. Bracket arm 28 may be molded from a glass-filled nylon material and may include an electrically conductive wire core (not shown) for carrying electrical current to any electrical accessories on the sunshade. Leg portion 32 of bracket arm 28 includes a tapered section 34, a head 36, and an upper boss 38.

Figure 2:
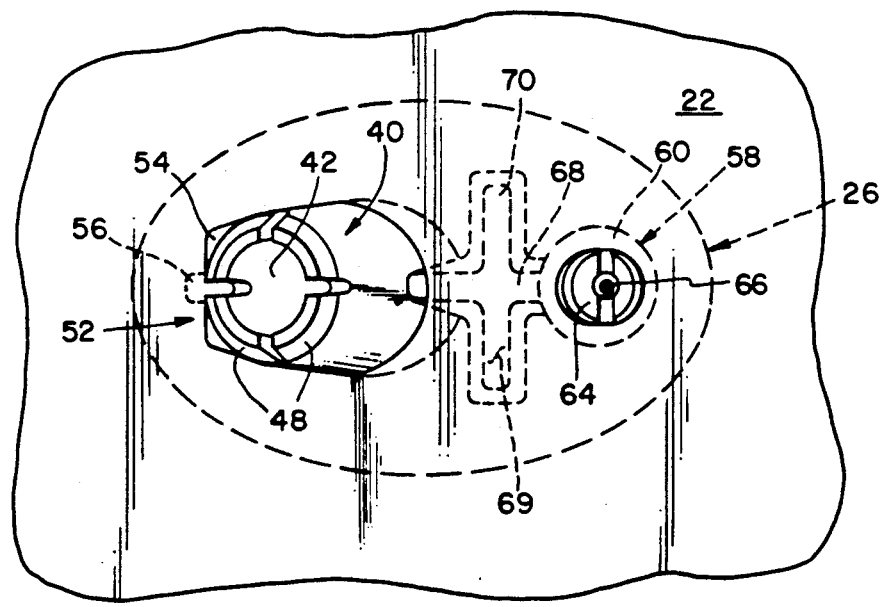
FIG. 2 is a view of the mounting bracket and arm assembly of FIG. 1 as seen from behind the vehicle roof, viewed in the direction of line 2—2 in FIG. 1.
Figure 3:
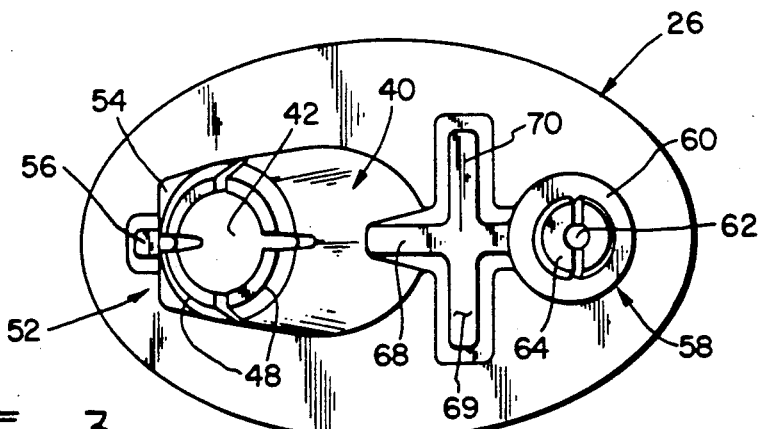
FIG. 3 is an elevational view of the mounting bracket according to the present invention.

Referring now to FIGS. 1-3, bracket 26 is molded from a suitable plastic, e.g., an acetal copolymer and includes a body portion 40 defining a generally cylindrical bore 42 in which leg portion 32 of bracket arm 28 is received. Bore 42 includes a lower opening 44 and an intermediate tapered section 46, which corresponds to tapered section 34 of bracket arm 28. Bracket arm 28 is axially retained within bore 42 by four circularly arranged, resilient locking tangs 48 formed in the upper end of body portion 40. Specifically, when bracket arm 28 is axially introduced into bore 42, tangs 48 are caused to radially expand and then retract so as to contact the underside of head 36. A desired amount of rotational friction between bracket arm 28 and bracket 26 is achieved by forming tapered section 34 and tapered section 46 with slightly different taper angles, thereby causing an interference fit therebetween.

In accordance with the present invention, bracket 26 includes a hook portion 52 and a fastener portion 58 for mounting bracket 26 to the roof of a vehicle. Hook portion 52 includes an integrally molded upper support portion 54 having a transversely extending support surface 53 that lies generally in a plane that is at an oblique angle relative to the axis of bore 42. Hook portion 52 also includes an integrally molded lower webbed portion 56 having an abutment surface 57. As shown in FIG. 1, surface 57 is tapered radially outwardly of upper support portion 54 with respect to the axis of body portion 40.

A fastener portion 58 is integrally molded into bracket 26 in spaced relationship with body portion 40, as shown in FIGS. 1-3, whereby a longitudinal axis of bracket 26 is defined between hook portion 52 and fastener portion 58. Fastener portion 58 includes a lower cylindrical base portion 60 having a passage 62 therein and a pair of circularly arranged resilient locking tangs 64 formed in the upper end of fastener portion 58. As best shown in FIG. 1, when fastening screw 66 is axially introduced into passage 62, tangs 64 are caused to radially expand thereby forming an interference fit between fastener portion 58 and sheet metal layer 22. An intermediate web 68 is integrally formed with body portion 40 and fastener portion 58 and extends axially therebetween. A transversely extending web portion 70 is integrally formed with web portion 68, whereby web portions 68 and 70 define an upper surface 69 which contacts sheet metal layer 22 to provide proper spacing and to prevent rotational movement of bracket 26 about its longitudinal axis.

Figure 4:
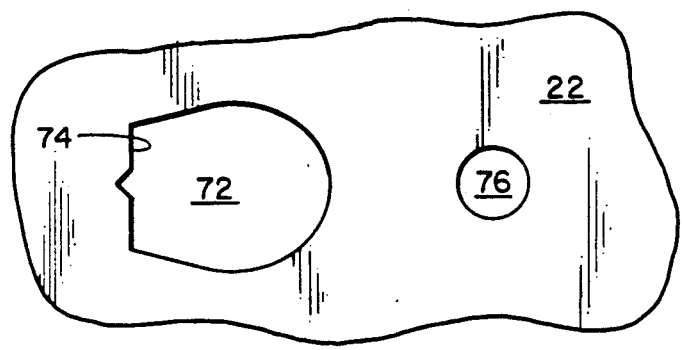
FIG. 4 is a view of the sheet metal layer into which the mounting bracket fits.

Referring to FIG. 4, sheet metal layer 22 includes a large opening 72 for receiving body portion 40 of bracket 26, and includes a transverse straight edge 74. A smaller annular opening 76 is spaced from opening 72 and is provided for receiving fastening portion 58 of bracket 26.

Referring to FIGS. 5A-5D, bracket and arm assembly 20 is mounted into a vehicle roof in the following manner. Sheet metal layer 22 and covering 24 of the roof are provided with apertures 72 and 76 corresponding generally in shape to body portion 40 and fastening portion 58, respectively. While the disclosed embodiment shows a pair of openings having generally rounded shapes, a single opening as well as other shapes may be used to achieve the desired locking action.

Figure 5A:
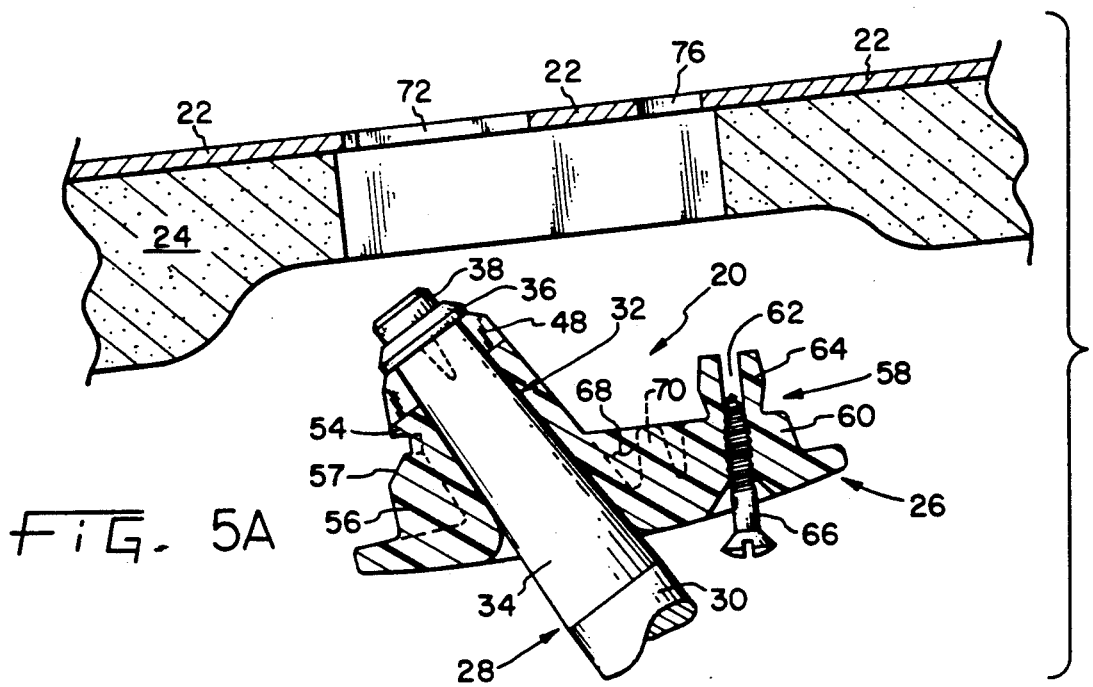
FIGS. 5A –5D are a series of sectional views of the assembly of FIG. 1, showing the mounting bracket and arm assembly ready for engagement with the sheet metal layer, showing engagement of the assembly with the sheet metal layer, pivoting of the assembly, and securing of the fastening screw into the fastening portion of the bracket, respectively.
Figure 5B:
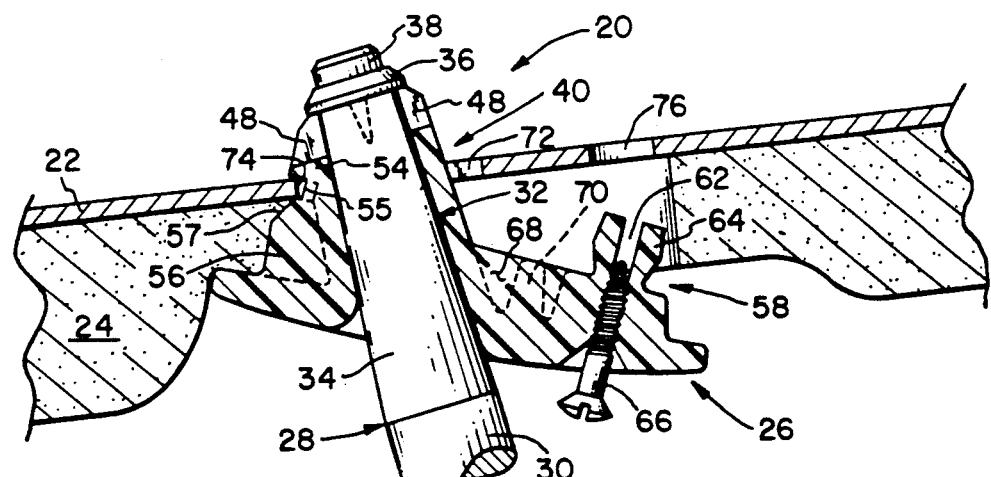
Figure 5C:
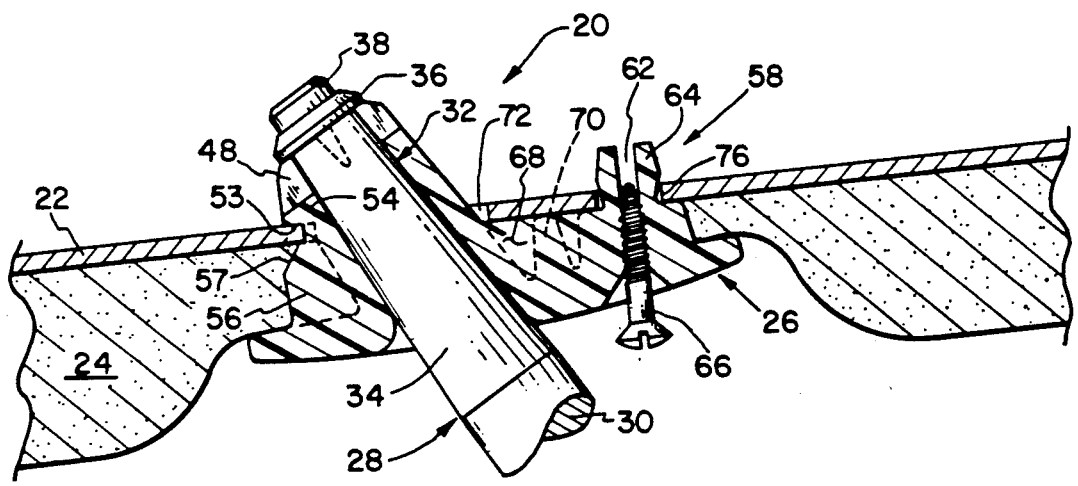
Figure 5D:
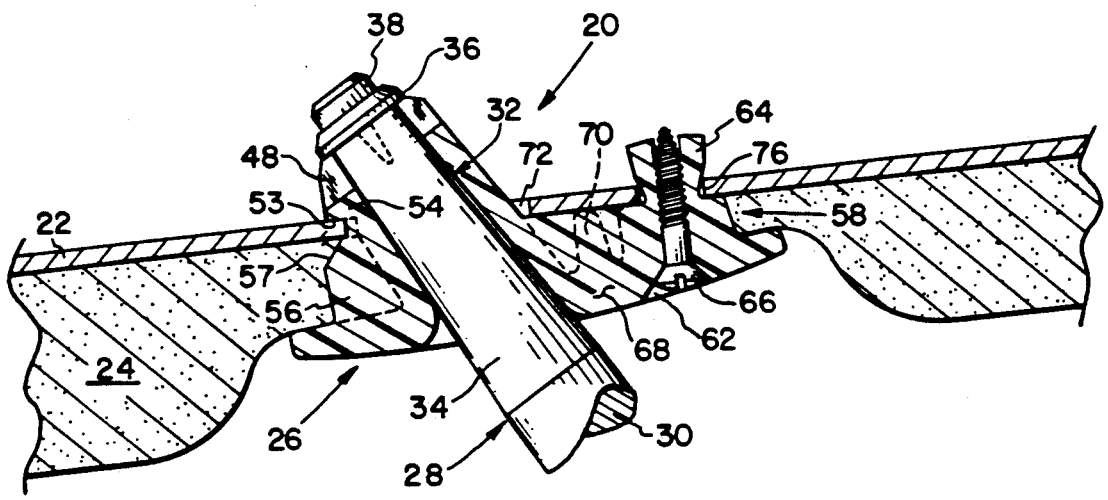

In the preferred manner of installation, bracket and arm assembly 20 is initially provided with fastening screw 66 partially displaced within passage 62 and secured therein As shown in FIG. 5B, assembly 20 is tilted to allow body portion 40 to pass through opening 72 at an angle until recessed edge 55 abuts straight edge 74. At this point, fastener portion 58 is sufficiently aligned with opening 76 so that upon rotating assembly 20 counterclockwise from the position shown in FIG. 5B, tangs 64 will extend through opening 76 as shown in FIG. 5C. Upon rotation, upper support portion 54 is located radially beyond opening 72, and support surface 53 engages the back surface of sheet metal 22. Fastening screw 66 is then tightened into passage 62 as shown in FIG. 5D, thereby expanding tangs 64 to securely retain assembly 20 in its mounted position. In this arrangement, support portion 54 secures one end of bracket 26 to sheet metal 22, and fastener portion 58 secures the other end of bracket 26 to sheet metal 22.

For maintenance purposes, bracket 26 is easily removed from sheet metal 22 by removing screw 66 from passage 62. Fastener portion 58 is then removed from opening 76 and rotated clockwise until upper support portion 54 is removed from opening 72.

An alternative embodiment to bracket and arm assembly 20 is bracket and arm assembly 120 shown in FIGS. 6-8. Assembly 120 generally includes a mounting bracket 126 and bracket arm 28 rotatably connected to bracket 126. Bracket 126 includes a body portion 140 defining a generally cylindrical bore in which leg portion 32 of bracket arm 28 is received. Bracket arm 28 is axially retained within the bore by four circularly arranged, resilient locking tangs 148 formed in the upper end of body portion 140. Bracket 126 further includes a hook arrangement 152 spaced from body portion 140 to define a longitudinal axis therebetween. Hook arrangement 152 comprises a pair of transversely spaced hooks and integrally molded upper support portions 154 (FIG. 8), each including a recessed portion 155. A fastener portion 158 is located on the axially opposite end of bracket 126 from support portions 154 as shown in FIG. 6, whereby fastener 158 and support portions 154 are triangularly arranged to provide maximum mounting stability. Fastener portion 158 of the preferred alternative embodiment includes an upstanding fastener housing portion 159 integrally molded with bracket 126 and having a passage 162 therein. Three webbed portions 170 extend transversely to the above longitudinal axis, whereby proper spacing and stability ate provided.

Referring to FIGS. 6-8, sheet metal layer 122 includes four openings for receiving the components of mounting bracket 126. Annular opening 172 receives body portion 140. Openings 174 are generally of similar size and extend in a triangular fashion about opening 172. As best shown in FIG. 8, two openings 174 receive support portions 154 of locking hook portion 152, and a third opening 174 receives fastener housing portion 159 of bracket 126.

Bracket and arm assembly 120 is mounted into a vehicle roof in a manner similar to that described heretofore for bracket and arm assembly 20. In particular, assembly 120 is tilted to allow support portions 154 to pass through their respective openings 174 in sheet metal 122. Thereafter, assembly 120 is rotated counterclockwise to allow body portion 140 and fastening housing portion 159 to simultaneously pass through respective openings 172 and 174. As shown in FIG. 7, a separate expandable locking member 165 is attached to the threaded end of fastener 66 prior to the mounting of assembly 120 to the vehicle roof. Once fastener portion 158 passes through opening 174, fastener 66 is rotated to draw locking member 165 downwardly such that legs 167 spread radially outwardly of opening 174 and contact the back sides of sheet metal 122, as shown in FIG. 6. Accordingly, bracket 126 is drawn upwardly and secured against sheet metal 122.

It will be appreciated that the foregoing is presented by way of illustration only, and not by way of any limitation, and that various alternatives and modifications may be made to the illustrated embodiment without departing from the spirit and scope of the invention.

What is claimed is:

1. A mounting apparatus for attaching a sunshade to a vehicle roof, comprising:
   bracket means for engaging the vehicle roof;
   opening means in said roof for receiving a portion of said bracket means therethrough;
   hook means for retaining a first end of said bracket means in said opening means; and
   retainer means for retaining an axially opposite second end of said bracket means to the vehicle roof subsequent to retention of said first end, said retainer means being removably attachable to said bracket means.

2. A mounting apparatus for attaching a sunshade to a vehicle roof, comprising:
   bracket means for engaging the vehicle roof;
   opening means in said roof for receiving a portion of said bracket means therethrough;
   hook means for retaining a first end of said bracket means in said opening means;
   fastener means at an axially opposite second end of said bracket means for retaining said second end in said opening means subsequent to retention of said first end; and
   stabilization means for preventing rotation of said bracket means about an axis of rotation through said hook means and said fastener means.

3. The apparatus according to claim 2, wherein said stabilization means comprises a first web portion extending between said hook means and said fastener means, and a second web portion integrally formed with said first web portion and extending transversely to said first web portion.

4. The apparatus according to claim 1, wherein said opening means includes a first opening corresponding to said hook means and a second opening corresponding to said retainer means.

5. A mounting apparatus for attaching a sunshade to a vehicle roof, comprising:
   bracket means for engaging the vehicle roof;
   opening means in said roof for receiving a portion of said bracket means therethrough;
   hook means for retaining a first end of said bracket means in said opening means;
   fastener means at an axially opposite second end of said bracket means for retaining said second end in said opening menas subsequent to retention of said first end; and
   wherein said fastener means includes a fastener opening in said bracket means and radially extending resilient tang means for providing an interference fit with said fastener opening.

6. A mounting apparatus for attaching a sunshade to a vehicle roof, comprising:
   bracket means for engaging the vehicle roof;
   opening means in said roof for receiving a portion of said bracket means therethrough;
   hook means for retaining a first end of said bracket means in said opening means; and
   fastener means at an axially opposite second end of said bracket means for retaining said second end in said opening means subsequent to retention of said first end, fastener means being actuated by rotation of a screw.

7. The apparatus according to claim 1, wherein said hook means includes two hook members being spaced transversely to a longitudinal axis through the bracket.

8. A bracket for mounting a vehicle sunshade against a vehicle roof, wherein two spaced ends of the bracket are in contact with a back surface of the roof through a mounted opening provided therein, comprising:
   hook means including a support surface for supporting one end of the bracket against the back surface of the roof; and
   manually actuable, radially expanding fastener means for supporting a second end of the bracket against the back surface of the roof.

9. The bracket according to claim 8, wherein said hook means is adapted to engage the roof prior to engagement of the roof by said fastener means.

10. The bracket according to claim 8, including stabilization means for preventing rotation of the bracket about an axis of rotation through the two spaced ends.

11. The bracket according to claim 10, wherein said stabilization means comprises a first web portion extending between said hook means and said fastener means, and a second web portion integrally formed with said first web portion and extending traverse to said first web portion.

12. The bracket according to claim 8, wherein said fastener means includes a fastener opening in the bracket and radially extending resilient tang means for providing an interference fit with said fastener opening.

13. The bracket according to claim 8, wherein said fastener means is actuated by a screw.

14. A method of attaching a sunshade to a vehicle roof, comprising the steps of:
   providing at least one opening in the vehicle roof, the opening having a first axial end and a second axial end;
   providing a sunshade mount including a bracket assembly having a hook portion and an axially opposed manually actuable fastener portion;
   placing the sunshade mount adjacent the vehicle roof such that the hook portion is inserted into the first end of the opening;
   rotating the bracket assembly through an axis of rotation until the fastener portion is inserted into the second end of the opening; and
   manually actuating the fastener portion until it is retained within the opening.

* * * * *

UNITED STATES PATENT AND TRADEMARK OFFICE
CERTIFICATE OF CORRECTION

PATENT NO. :     5,098,151
DATED      :     March 24, 1992
INVENTOR(S) :    Don M. Peterson It is certified that error appears in the above-identified patent and that said Letters Patent is hereby corrected as shown below:

Claim 5, Column 6, Line 5, Change "menas" to --means--.

Claim 6, Column 6, Line 21, Before "fastener" inset --said--.

Claim 11, Column 6, Line 45, Change "traverse" to --transverse--.

Signed and Sealed this

Eighth Day of June, 1993

Attest:

MICHAEL K. KIRK

Attesting Officer          Acting Commissioner of Patents and Trademarks